(12) United States Patent
Zhang et al.

(10) Patent No.: US 12,402,176 B2
(45) Date of Patent: Aug. 26, 2025

(54) PUSCH VALIDATION FOR FRAME-BASED EQUIPMENT

(71) Applicant: QUALCOMM Incorporated, San Diego, CA (US)

(72) Inventors: Xiaoxia Zhang, San Diego, CA (US); Changlong Xu, Beijing (CN); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 17/800,867

(22) PCT Filed: Feb. 28, 2020

(86) PCT No.: PCT/CN2020/077089
§ 371 (c)(1),
(2) Date: Aug. 18, 2022

(87) PCT Pub. No.: WO2021/168772
PCT Pub. Date: Sep. 2, 2021

(65) Prior Publication Data
US 2023/0085389 A1    Mar. 16, 2023

(51) Int. Cl.
*H04W 74/0833*    (2024.01)
(52) U.S. Cl.
CPC ............... *H04W 74/0833* (2013.01)
(58) Field of Classification Search
None
See application file for complete search history.

(56) References Cited

U.S. PATENT DOCUMENTS

2017/0231011 A1    8/2017    Park et al.
2018/0359772 A1   12/2018    Park et al.
(Continued)

FOREIGN PATENT DOCUMENTS

CN    108886447 A    11/2018
CN    110234098 A     9/2019
(Continued)

OTHER PUBLICATIONS

VIVO: "Remaining Issues on 2-step RACH Procedure", 3GPP TSG RAN WG1 #100, R1-2000305, No. e-Meeting, Feb. 24, 2020-Mar. 6, 2020, 4 Pages, Feb. 14, 2020, p. 1-4.
(Continued)

*Primary Examiner* — Walter J Divito
(74) *Attorney, Agent, or Firm* — Loza & Loza, LLP/Qualcomm

(57) ABSTRACT

Aspects of the present disclosure provide for managing random access channel (RACH) procedures in wireless communication systems. In some examples, a UE includes a processor, a transceiver communicatively coupled to the processor and configured to communicate with a scheduling entity in the wireless communication network, and a memory communicatively coupled to the processor. The processor is configured to receive a signal from a base station at the beginning of a fixed frame period during a two-step random access procedure, determine whether a resource for a transmission occasion overlaps one or more symbols located at an edge of the fixed frame period, and discard the resource for the transmission occasion at the UE when the resource overlaps the one or more symbols located at the edge of the fixed frame period.

30 Claims, 13 Drawing Sheets

(56) References Cited

U.S. PATENT DOCUMENTS

2019/0335456 A1   10/2019  Yerramalli et al.
2019/0335500 A1   10/2019  Zhang et al.
2021/0307072 A1*  9/2021  Kusashima ....... H04W 72/0453

FOREIGN PATENT DOCUMENTS

CN        110831179 A     2/2020
WO   WO-2018127042 A1   7/2018

OTHER PUBLICATIONS

International Search Report and Written Opinion—PCT/CN2020/077089—ISA/EPO—Nov. 30, 2020.

Samsung: "Channel Access Procedures for NR-U", 3GPP TSG-RAN WG1 Meeting #99, 3GPP Draft, R1-1912449, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, pp. 1-13, Nov. 8, 2019 (Nov. 8, 2019), XP051823426, Retrieved from the Internet: URL: https://ftp.3gpp.org/tsg_ran/WG1_RL1/TSGR1_99/Docs/R1-1912449.zip, R1-1912449—Channel access procedures for NR-U.docx [retrieved on Nov. 8, 2019], p. 2, Sections 1-7, The whole document.

3GPP TS 37.213: "3rd Generation Partnership Project, Technical Specification Group Radio Access Network, Physical Layer Procedures for Shared Spectrum Channel Access (Release 16)", 3GPP Standard, Technical Specification, 3GPP, Mobile Competence Centre, 650, Route Des Lucioles, F-06921, Sophia-Antipolis Cedex, France, vol. RAN WG1, No. V16.0.0, Jan. 14, 2020 (Jan. 14, 2020), pp. 1-25, XP051860772.

Charter Communications: "Charter Communications", 3GPP TSG RAN WG1 Meeting #99, R1-1913429, 3GPP, Mobile Competence Centre, 650, Route Des Lucioles, F-06921 Sophia-Antipolis Cedex, France, vol. RAN WG1, No. Reno, NV, USA, Nov. 18, 2019-Nov. 22, 2019, 18 Pages, Nov. 25, 2019 (Nov. 25, 2019), XP051830708, p. 1, section 1. Introduction, p. 11, section 3 Aspects for random, access—p. 13, section 3.2 Enhancements for Msg3.

Samsung: "Enhancements to Initial Access Procedure for NR-U", 3GPP TSG RAN WG1 Meeting #99, R1-1912450, 3GPP, Mobile Competence Centre, 650, Route Des Lucioles, F-06921 Sophia-Antipolis Cedex, France, vol. RAN WG1, No. Reno, USA, Nov. 18, 2019-Nov. 22, 2019, 11 Pages, Nov. 8, 2019, XP051823427, p. 5, sec. 3 Enhancement to Random Access Procedure—p. 6, sec. 3.1 Valid RO determination, fig. 4, p. 10, sec. 6 Conclusion.

Supplementary European Search Report - EP20922315 - Search Authority - MUNICH - 2023-09-29 (202877EP).

VIVO: "Remaining Issues on 2-Step RACH Procedure", 3GPP TSG RAN WG1 #100, R1-2000305, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, 4 Pages, Feb. 14, 2020 (Feb. 14, 2020), XP051852794, p. 3, section 2.3. PUSCH occasion validation rule—p. 4, section 3, Conclusion.

VIVO: "Remaining Issues on Initial Access Procedures", 3GPP TSG RAN WGi #100, R1-2000310, 3rd Generation Partnership Project (3GPP), Mobile Competence Centre, 650, Route Des Lucioles, F-06921, Sophia-Antipolis Cedex, France, vol. RAN WG1, No. e-Meeting, Feb. 24, 2020-Mar. 6, 2020, 3 Pages, Feb. 14, 2020 ( Feb. 14, 2020), XP052343375, the whole document.

* cited by examiner

PUSCH VALIDATION FOR FRAME-BASED EQUIPMENT

CROSS-REFERENCE TO RELATED APPLICATION(S)

This application is the U.S. national stage of PCT patent application number PCT/CN2020/077089 filed on Feb. 28, 2020.

TECHNICAL FIELD

The technology discussed below relates generally to wireless communication systems, and more particularly, to configuration of a random access channel (RACH) in a wireless communication network.

INTRODUCTION

Wireless communication networks are widely deployed to provide various communication services such as telephony, video, data, messaging, broadcasts, and so on. Such networks, which are usually multiple access networks, support communications for multiple users by sharing the available network resources.

In order for a user equipment (UE) to communicate with a base station, such as a gNB within a 5G wireless communication system, the UE informs its presence to the base station. UEs may inform their presence to the base station either initially or after link failure using a random access procedure in which each UE transmits a randomly selected preamble sequence and the base station allocates resources to detected UEs by transmitting random access response messages to the detected UEs.

A random access signal may be transmitted by a UE on an uplink random access channel (RACH). The RACH signal waveform may include the randomly selected preamble, along with a cyclic prefix (CP) that includes a portion of the preamble copied to the beginning of the RACH signal waveform and a guard time (GT) at the end of the RACH signal waveform. Since the round-trip time (RTT) of communications between the base station and each UE may be different depending on the location of the UE, the CP and GT may each be designed to be equal to the maximum RTT that may be experienced by a UE served by the base station to ensure that RACH signals received from different UEs (and different locations) may be decoded appropriately. Thus, the RACH signal duration may be set to be equal to the preamble length plus twice the maximum RTT.

As the demand for mobile broadband access continues to increase, research and development continue to advance communication technologies, including technologies for enhancing RACH signals in particular, not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure relate to the configuration of RACH signals in wireless communication systems, including but not limited to those specified under standards for 5G New Radio (NR).

In one aspect of the disclosure, a method for a UE to communicate with a base station within a wireless communication network includes receiving a signal from the base station at the beginning of a fixed frame period during a two-step random access procedure, determining whether a resource for a transmission occasion overlaps one or more symbols located at an edge of the fixed frame period, and discarding the resource for the transmission occasion at the UE when the resource overlaps the one or more symbols located at the edge of the fixed frame period.

Another aspect of the disclosure provides a UE in a wireless communication network. The UE includes a processor, a transceiver communicatively coupled to the processor and configured to communicate with a scheduling entity in the wireless communication network, and a memory communicatively coupled to the processor. The processor is configured to receive a signal from a base station at the beginning of a fixed frame period during a two-step random access procedure, determine whether a resource for a transmission occasion overlaps one or more symbols located at an edge of the fixed frame period, and discard the resource for the transmission occasion at the UE when the resource overlaps the one or more symbols located at the edge of the fixed frame period.

Another aspect of the disclosure provides a method of wireless communication operable at a base station within a wireless communication network. The method includes sensing that a channel is unoccupied at the beginning of a fixed frame period during a two-step random access procedure transmitting a signal to a UE after sensing that the channel is unoccupied, and receiving a MsgA transmission from the UE when a resource for a transmission occasion is dissociated from one or more symbols located at an edge of the fixed frame period. The UE may be configured to discard the resource for the transmission occasion at the UE when the resource overlaps the one or more symbols located at the edge of the fixed frame period.

Another aspect of the disclosure provides a scheduling entity in a wireless communication network. The scheduled entity includes a processor, a transceiver communicatively coupled to the processor and configured to communicate with a scheduled entity in the wireless communication network, and a memory communicatively coupled to the processor. The processor is configured to sense that a channel is unoccupied at the beginning of a fixed frame period during a two-step random access procedure, transmit a signal to a UE after sensing that the channel is unoccupied, and receive a MsgA transmission from the UE when a resource for a transmission occasion is dissociated from one or more symbols located at an edge of the fixed frame period. The UE may be configured to discard the resource for the transmission occasion at the UE when the resource overlaps the one or more symbols located at the edge of the fixed frame period.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures.

While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
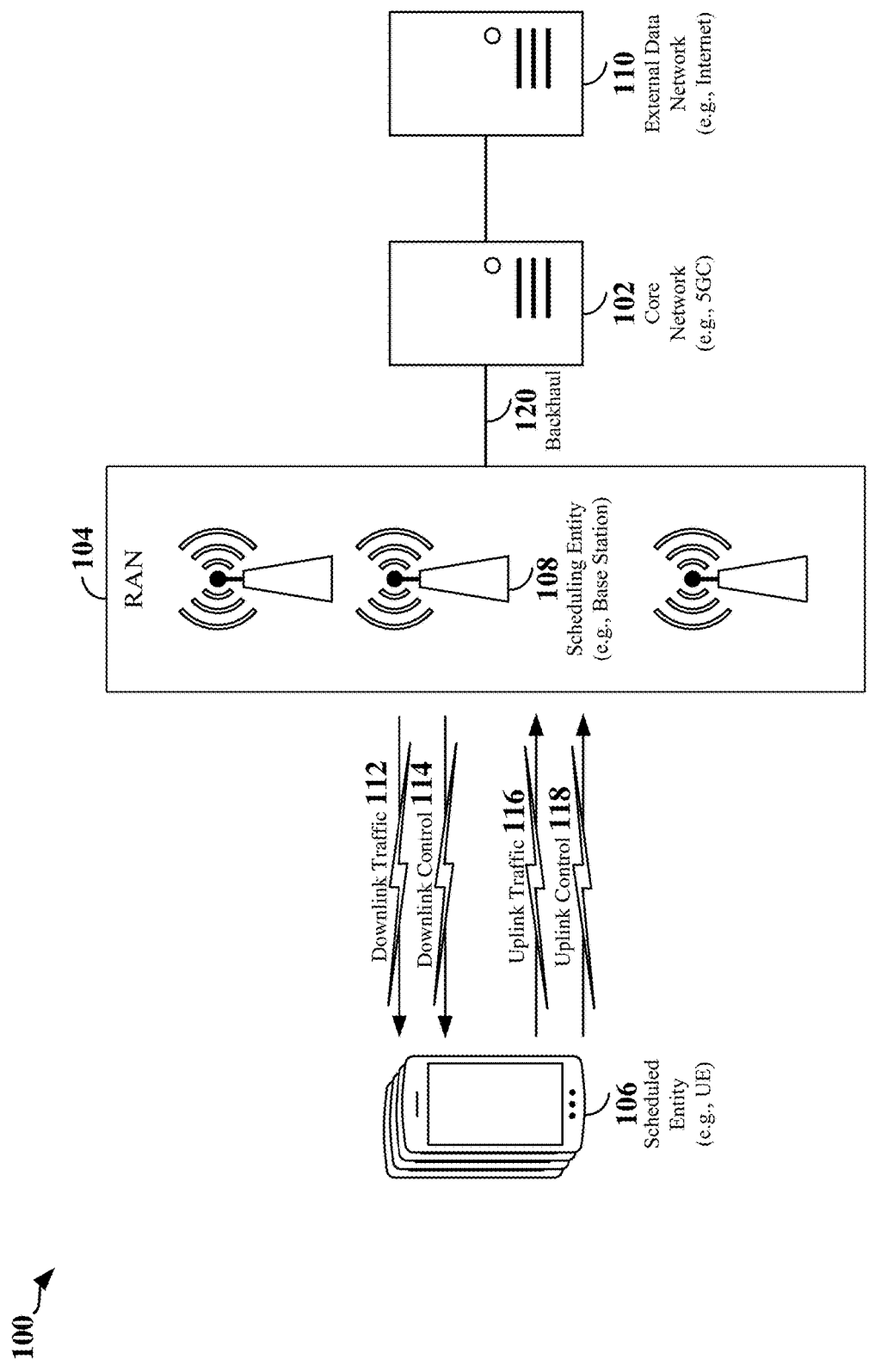
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate using an implementation of 5G NR (referred 5G NR-U) that can operate in unlicensed 5 GHz and 6 GHz frequency bands. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the base station 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a base station 108 may broadcast downlink traffic 112 to one or more scheduled entities 106. Broadly, the base station 108 is a node or device responsible for scheduling traffic in a wireless communication network, including the downlink traffic 112 and, in some examples, uplink traffic 116 from one or more scheduled entities 106 to the base station 108. On the other hand, the UE 106 is a node or device that receives downlink control information 114, including but not limited to scheduling information (e.g., a grant), synchronization or timing information, or other control information from another entity in the wireless communication network such as the base station 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
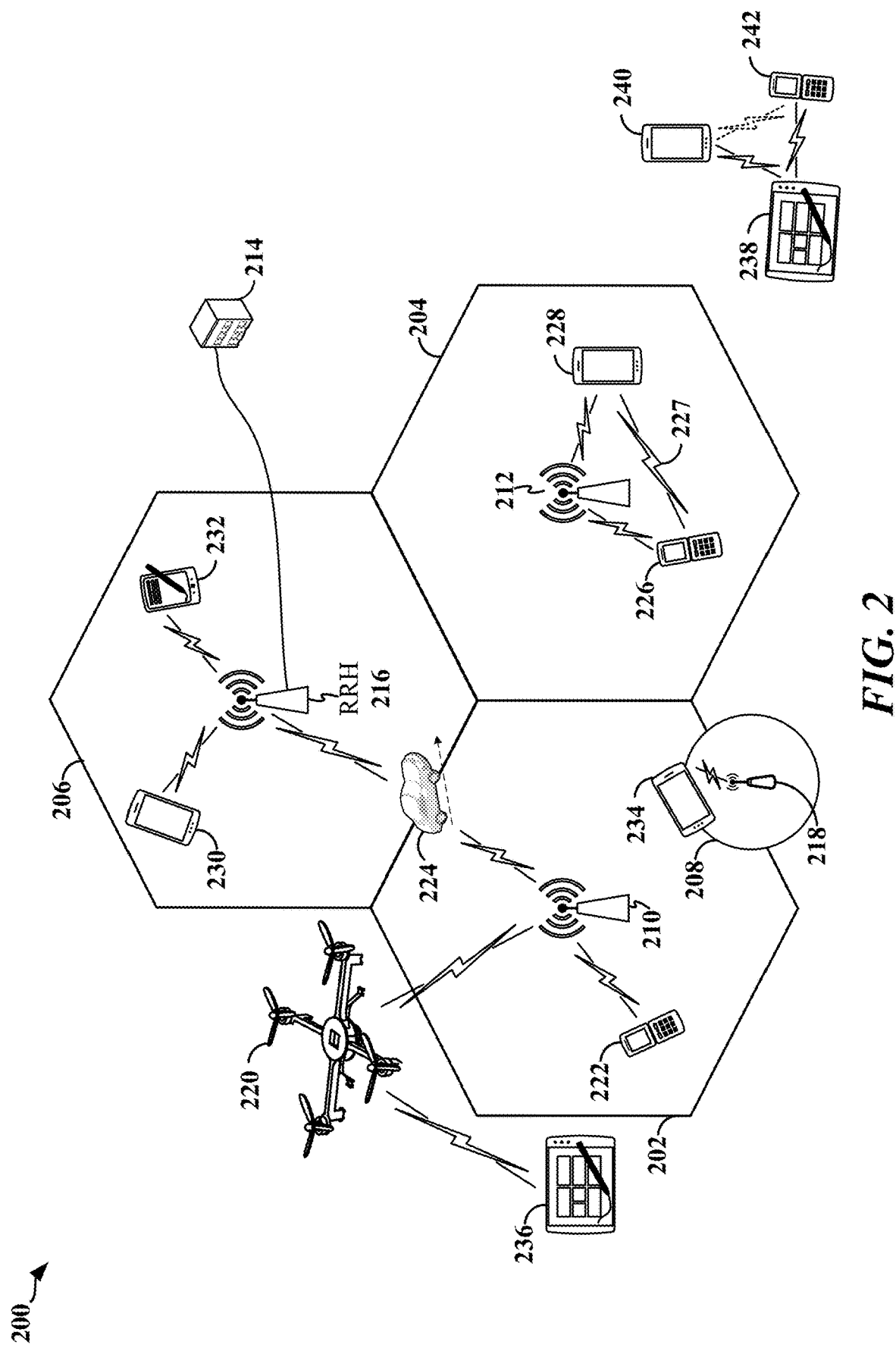
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the scheduling entity or base station 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/UE 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control. Sidelink control information may in some examples include a request signal, such as a request-to-send (RTS), a source transmit signal (STS), and/or a direction selection signal (DSS). The request signal may provide for a scheduled entity to request a duration of time to keep a sidelink channel available for a sidelink signal. Sidelink control information may further include a response signal, such as a clear-to-send (CTS) and/or a destination receive signal (DRS). The response signal may provide for the scheduled entity to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In certain 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
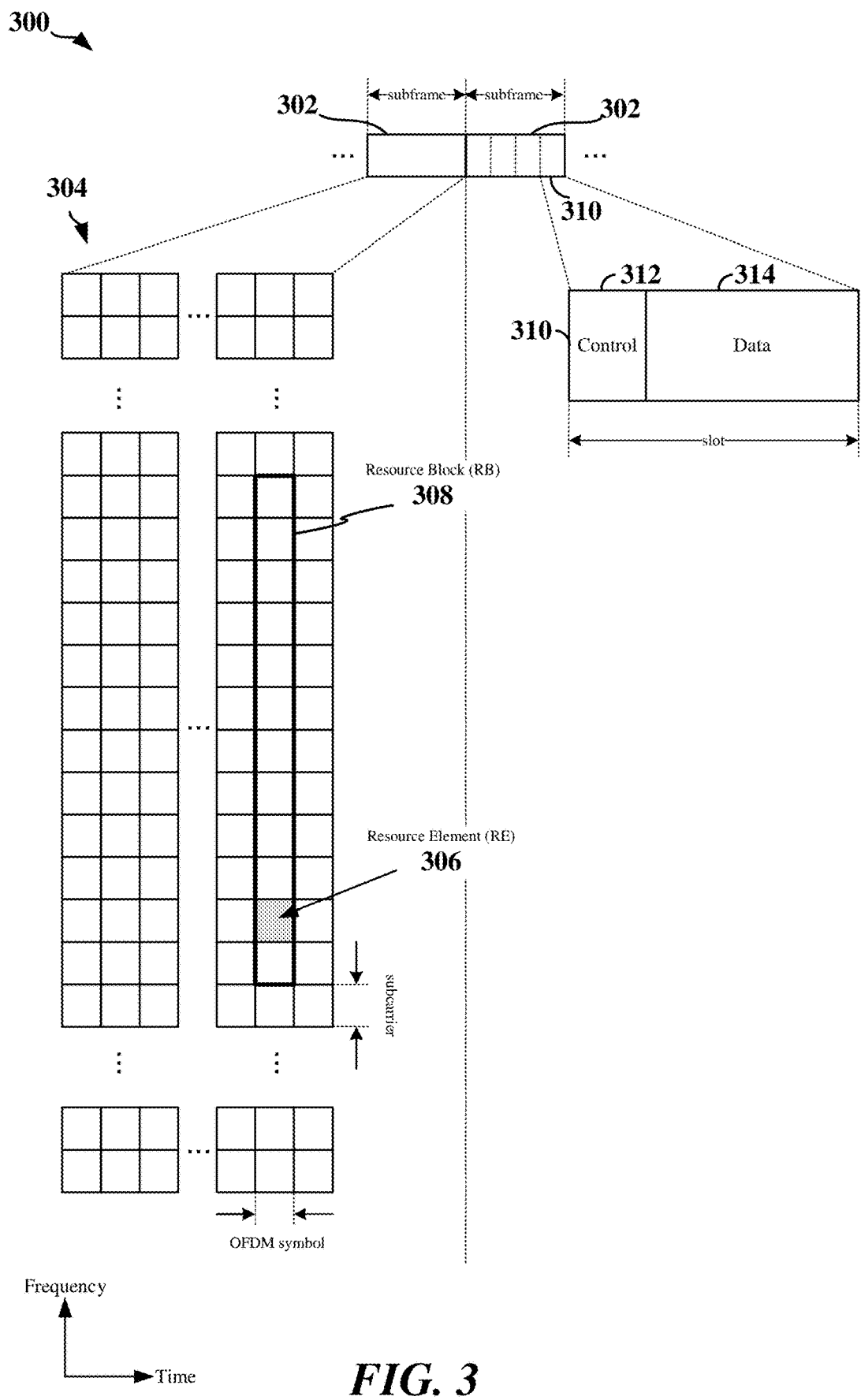
FIG. 3 is a schematic diagram illustrating organization of wireless resources in an air interface utilizing orthogonal frequency divisional multiplexing (OFDM).

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 5, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels such as a physical downlink shared channel (PDSCH) or a physical uplink shared channel (PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, where the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a PUSCH. In some examples, one or more REs 306 within the data region 314 may be configured to carry system information blocks (SIB s), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 2 and 3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
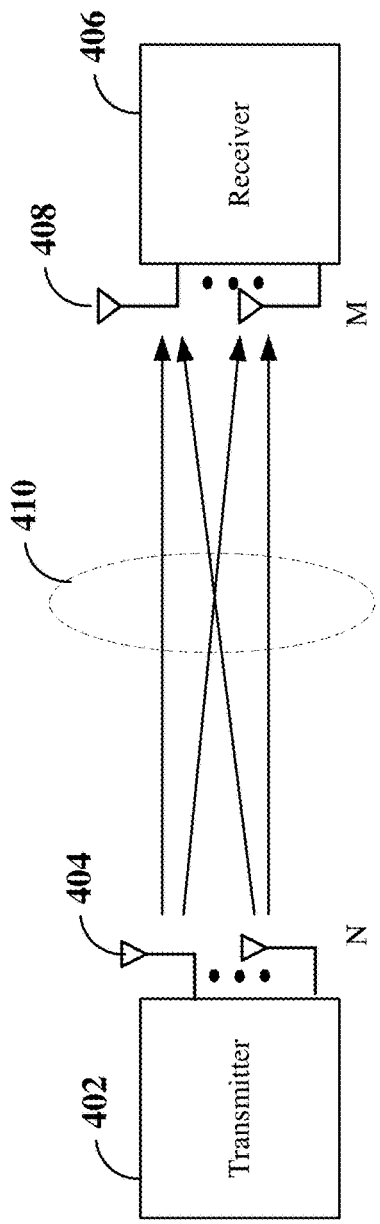
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using beams of varying beam widths. For example, a base station may be configured to utilize a wider beam when communicating with a UE that is in motion and a narrower beam when communicating with a UE that is stationary. In some examples, to select a particular beam for communication with a UE, the base station may transmit a reference signal, such as a synchronization signal block (SSB) or channel state information reference signal (CSI-RS), on each of a plurality of beams in a beam-sweeping manner. The UE may measure the reference signal received power (RSRP) on each of the beams and transmit a beam measurement report to the base station indicating the RSRP of each of the measured beams. The base station may then select the particular beam for communication with the UE based on the beam measurement report. In other examples, when the channel is reciprocal, the base station may derive the particular beam to communicate with the UE based on uplink measurements of one or more uplink reference signals, such as a sounding reference signal (SRS).

In 5G New Radio (NR) systems, particularly for above 6 GHz or mmWave systems, beamformed signals may be utilized for most downlink channels, including the physical downlink control channel (PDCCH) and PDSCH. In addition, broadcast control information, such as the master system information block (MSIB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub 6 GHz systems.

Figure 5:
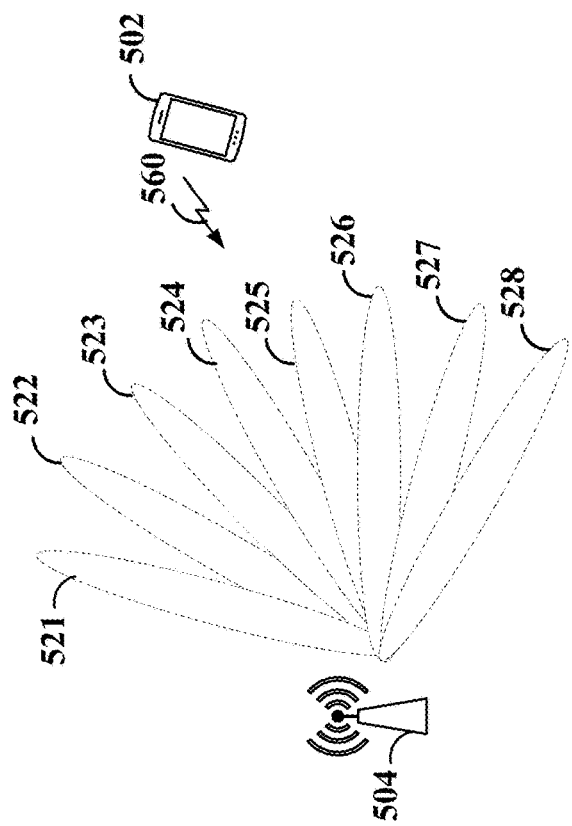
FIG. 5 is a diagram illustrating an example of communication between a base station and a user equipment (UE) using beamforming according to some aspects.

FIG. 5 is a diagram illustrating communication between a base station (BS) 504, such as a gNB, and a UE 502 using downlink beamformed signals according to some aspects of the disclosure. The base station 504 may be any of the base stations or scheduling entities illustrated in FIGS. 1 and 2, and the UE 502 may be any of the UEs or scheduled entities illustrated in FIGS. 1 and 2. It should be noted that while some beams are illustrated as adjacent to one another, such an arrangement may be different in different aspects. In some examples, beams transmitted during a same symbol may not be adjacent to one another. In some examples, the BS 504 may transmit more or less beams distributed in all directions (e.g., 360 degrees).

In the example shown in FIG. 5, a beam set contains eight different beams 521, 522, 523, 524, 525, 526, 527, 528, each associated with a different beam direction. In some examples, the BS 504 may be configured to sweep or transmit each of the beams 521, 522, 523, 524, 525, 526, 527, 528 during a synchronization slot. For example, the BS 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)).

The UE 502 utilizes the received beam reference signals to identify the beams and perform received power measurements (e.g., RSRP) on the beam reference signals. The UE 502 may then transmit a beam measurement report 560 the respective beam index and RSRP of each beam 521-528. The BS 504 may then determine the downlink beam (e.g., beam 524) on which to transmit unicast downlink control information and/or user data traffic to the UE 502 with the highest gain from the beam measurement report 560. Transmission of the beam measurement report 560 may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

In other examples, when the channel is reciprocal (e.g., the downlink and uplink channel qualities are the same), the BS 504 may derive a downlink beam. Derivation can be based on the UE 502's uplink measurements, such as by measuring the received power, quality, or other variable of a sounding reference signal (SRS) or other uplink reference signal. In some examples, a UE may not transmit a beam measurement report 560 to the BS 504. In some examples, the BS 504 may select a pair of beams (e.g., a downlink transmit beam associated with the BS 504 and a downlink reception beam associated with the UE 502) as a beam pair link (BPL) based on the received beam measurement report 560 and/or uplink measurements.

When the BS 504 switches from one downlink beam to another downlink beam, the BS 504 may perform link adaptation. Link adaptation can adjust a modulation and coding scheme (MCS). Adjustment may occur with respect to a link budget associated with a new downlink beam. In some examples, the BS 504 may utilize an outer-loop link adaptation process in which the MCS may be modified based on the HARQ feedback (e.g., ACKs and NACKs) from the UE 502. In other examples, the BS 504 may dynamically schedule the transmission of a CSI-RS to the UE 502 on the new downlink beam. From the CSI-RS, the UE 502 may measure the channel quality and provide channel state feedback (CSF) to the BS 504. The CSF may include, for example, a channel quality indicator (CQI) from which the BS 504 may select/adjust the MCS utilized for unicast transmissions to the UE 502 on the new downlink beam. Upon selecting/adjusting the MCS, the BS 504 may then further utilize an outer-loop link adaptation process to further modify the MCS, as needed, until another CSI-RS is transmitted to the UE 502.

Figure 6:
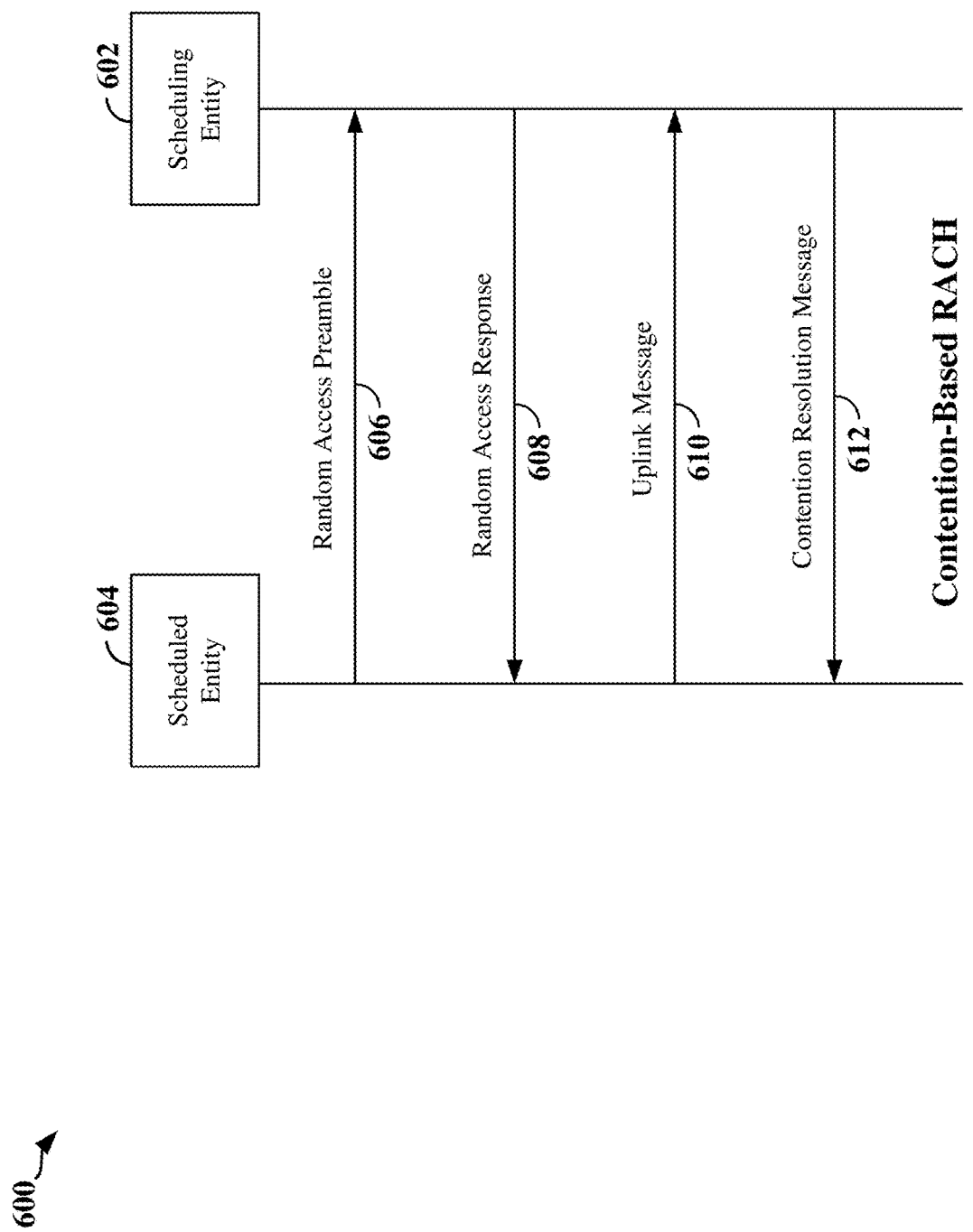
FIG. 6 is a diagram illustrating an example of a contention based random access procedure utilizing a random access channel (RACH).

One example of an uplink control channel is the Random Access Channel (RACH). The RACH may be used, for example, in a random access procedure during initial access of the uplink. FIG. 6 is a diagram illustrating an example of a contention based random access procedure 600 between a base station 602 and a UE 604. The base station 602 may correspond, for example, to any of the scheduling entities shown in FIGS. 1 and/or 2. In addition, the UE 604 may correspond, for example, to any of the scheduled entities shown in FIGS. 1 and/or 2.

The random access procedure 600 shown in FIG. 6 is initiated by the UE 604 randomly selecting a preamble from an available set of preambles within the cell served by the base station 602, and transmitting the selected preamble to the base station 602 in a RACH preamble message 606. In an example, the UE 604 may select from 64 possible preamble sequences for inclusion in the RACH preamble message 606.

If the preamble is successfully detected by the base station 602, the base station 602 transmits a random access response (RAR) message 608 to the UE 604 on the PDCCH. The RAR message 608 includes an identifier of the preamble sent by the UE 604, a Timing Advance (TA), a temporary cell radio network temporary identifier (TC-RNTI) or random access (RA) RNTI for the UE 604 and a grant of assigned uplink resources. Upon receipt of the RAR message 608, the UE 604 compares the preamble ID to the preamble sent by the scheduled entity in the RACH preamble message 606. If the preamble ID matches the preamble sent in the RACH preamble message 606, the UE 604 applies the timing advance and starts a contention resolution procedure.

Since the preamble is selected randomly by the scheduled entity, if another scheduled entity selects the same preamble in the same RACH resource, a collision may result between the two scheduled entities. Any collisions may then be resolved using the contention resolution procedure. During contention resolution, the UE 604 transmits an uplink message 610 on the common control channel (CCCH) using the TA and assigned uplink resources. In an example, the uplink message 610 is a Layer 2/Layer 3 (L2/L3) message, such as a Radio Resource Control (RRC) Connection Request message. The uplink message 610 includes an identifier of the UE 604 for use by the scheduling entity in resolving any collisions. Although other scheduled entities may transmit colliding uplink messages utilizing the TA and assigned uplink resources, these colliding uplink messages will likely not be successfully decoded at the scheduling entity since the colliding uplink messages were transmitted with TAs that were not intended for those scheduled entities.

Upon successfully decoding the uplink message, the base station 602 transmits a contention resolution message 612 to the UE 604. The contention resolution message 612 may be, for example, an RRC-Connection Setup message. In addition, the contention resolution message 612 includes the identifier of the UE 604 that was received in the uplink message 610. The UE 604, upon receiving its own identity back in the contention resolution message 612, concludes that the random access procedure was successful and completes the RRC connection setup process. Any other scheduled entity receiving the RRC-Connection Setup message 612 with the identity of the UE 604 will conclude that the random access procedure failed and re-initialize the random access procedure.

Figure 7:
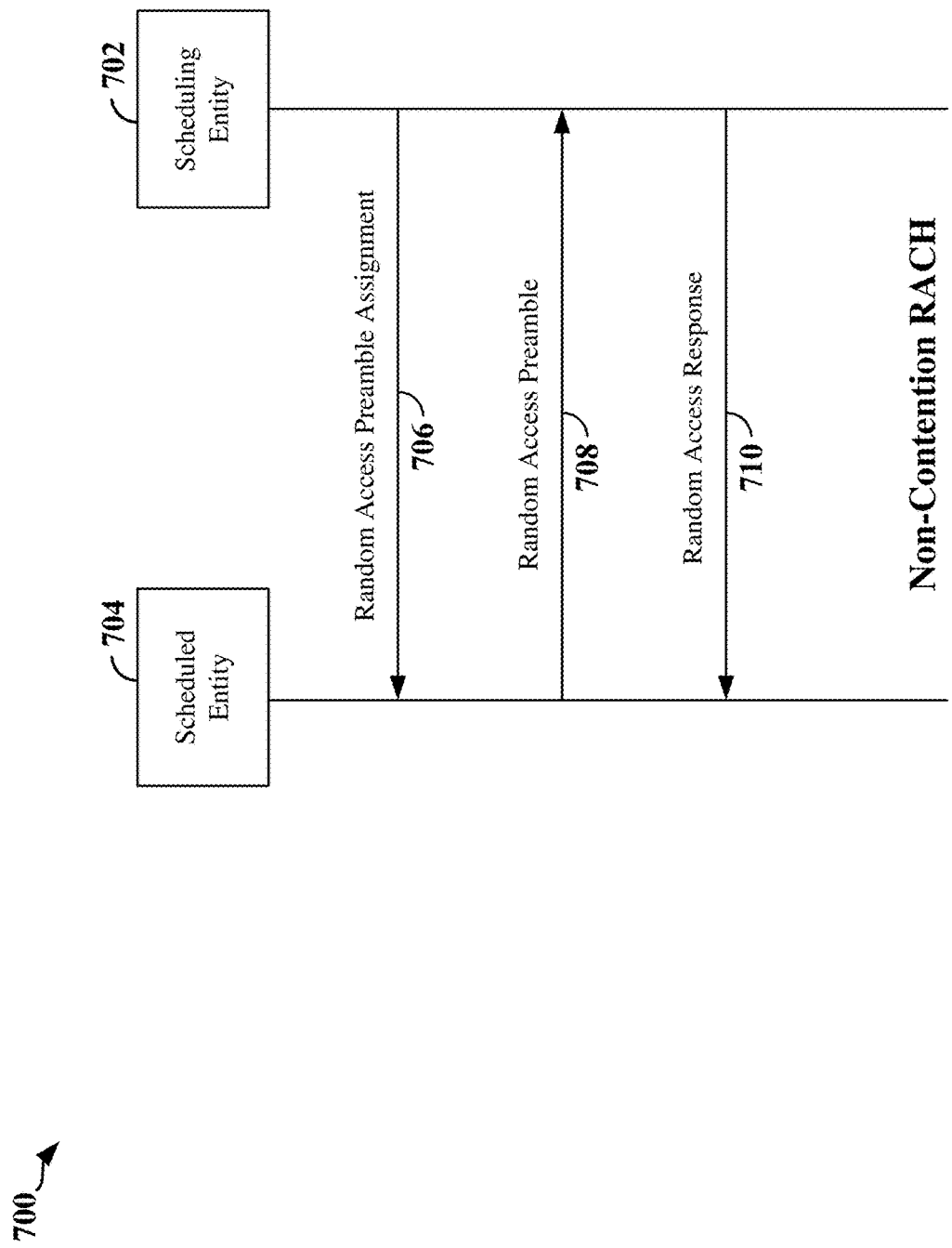
FIG. 7 is a diagram illustrating an example of a non-contention based random access procedure utilizing the RACH.

FIG. 7 is a diagram illustrating an example of a non-contention based random access procedure 700 between a base station 702 and a UE 704. The base station 702 may correspond, for example, to any of the scheduling entities shown in FIGS. 1 and/or 2. In addition, the UE 704 may correspond, for example, to any of the scheduled entities shown in FIGS. 1 and/or 2.

The non-contention based random access procedure 700 may be used, for example, during handovers, after uplink synchronization loss or positioning of the scheduled entity. The non-contention based random access procedure is initiated by the base station 702 selecting a preamble from a reserved set of preambles within the cell served by the base station 702, and transmitting the selected preamble to the UE 704 in a RACH preamble assignment message 706. In an example, the reserved set of preambles may be separate from the pool of preambles available for random selection in contention based random access. Thus, the reserved set of preambles may be assigned by the scheduling entity in a contention-free manner.

The UE 704 may then transmit the assigned preamble to the base station 702 in a RACH preamble message 708. The base station 702 may then transmit a random access response (RAR) message 710 on the physical downlink control channel (PDCCH). The RAR message 710 includes an identifier of the preamble sent by the UE 704, a Timing Advance (TA), a temporary cell radio network temporary identifier (TC-RNTI) or random access (RA) RNTI for the UE 704 and a grant of assigned uplink resources. Upon receipt of the RAR message 710, the UE 704 applies the timing advance and may initiate an uplink transmission 712 using the assigned uplink resources.

Figure 8:
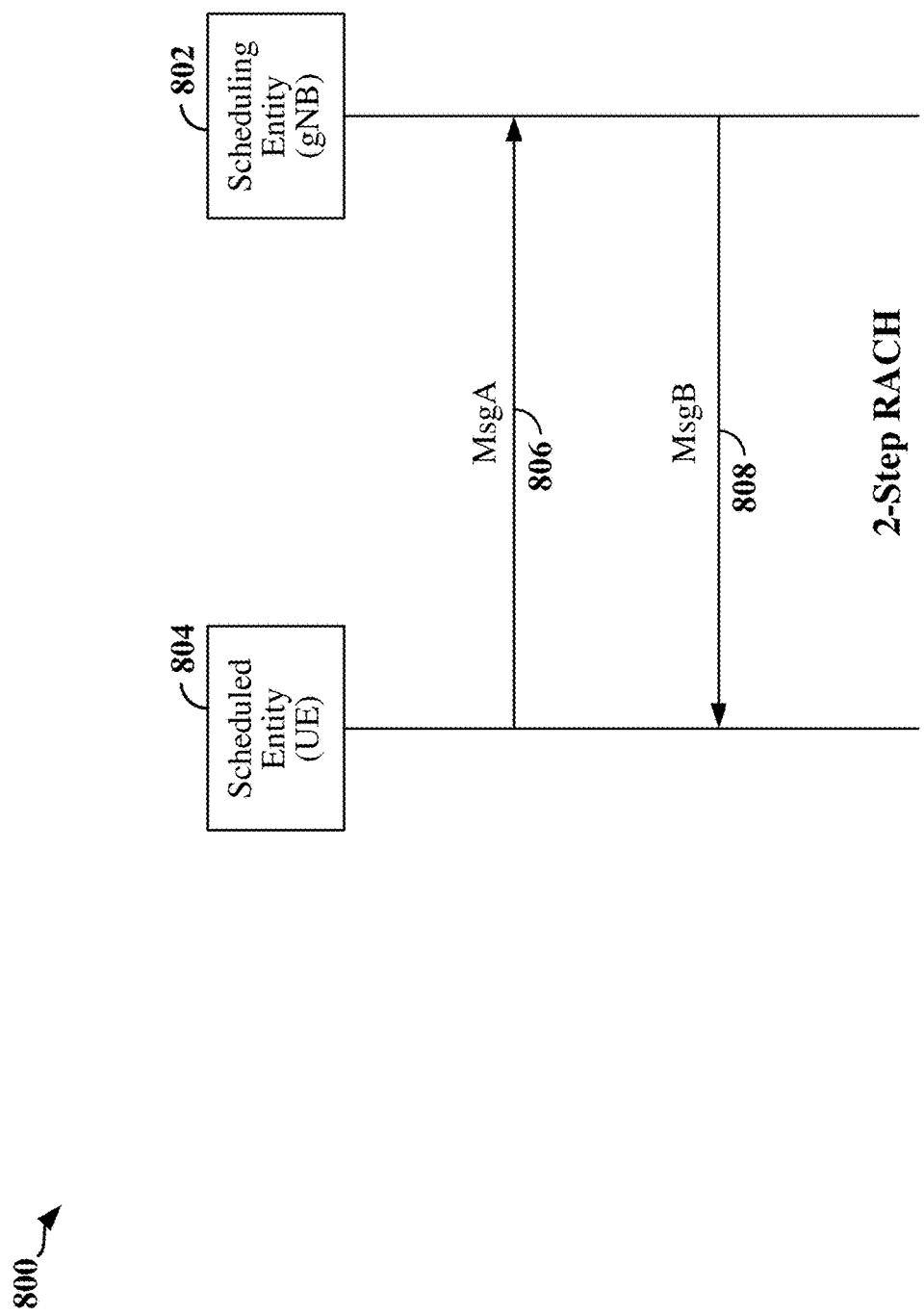
FIG. 8 is a diagram illustrating an example two-step RACH procedure.

The four-step contention-based random-access procedure 600 or the three-step non-contention based random access procedure 700 can be compressed into the two-step random-access procedure 800 illustrated in FIG. 8. The two-step random-access procedure 800 reduces overhead and latency associated with by control signaling removing a transmission in each direction between the UE 804 and base station or scheduling entity, such as the illustrated gNB 802. With reference also to FIG. 6, the two-step random-access procedure 800 commences with a transmission by the UE 804 of a single message (MsgA 806) that includes the RACH preamble message 606 and uplink message 610 of the contention-based random-access procedure 600. The uplink message 610 may be a scheduled PUSCH transmission. The gNB 802 responds with a single message (MsgB 808) that includes the random-access response 608 and the contention resolution message 612.

Additional benefits accrued from the use of two-step random-access procedure 800 in 5G NR-U implementations include a potential reduction in the number of listen-before-talk instances in RANs when frame-based equipment (FBE) mode is indicated. In FBE mode, random access by a UE 804 may be obtained through a listen-before-talk mode, in which the UE 804 transmits to a base station only if the base station 806 transmits first. The UE 804 waits for MsgB 808 after transmitting MsgA 806. The gNB 802 may not respond when, for example, multiple UEs have transmitted a MsgA 806.

Figure 9:
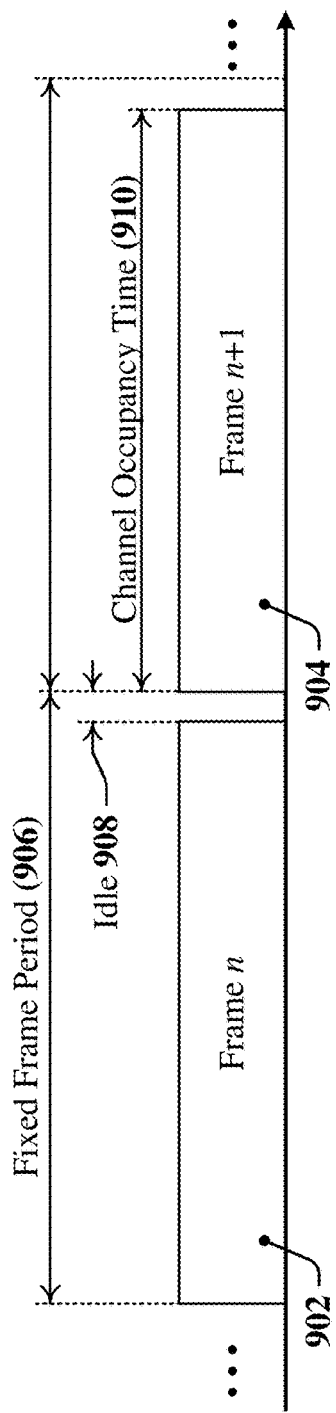
FIG. 9 is a diagram illustrating an example of a frame structure with a fixed frame period.

Transmissions in a shared spectrum may have a fixed frame period (FFP). In one example, a frame may have a 1 ms FFP. FIG. 9 illustrates a generalized frame structure 900 that may be used in FBE implementations where an idle period 908 is defined between frames 902, 904. In one example, the 1 ms subframe 302 illustrated in FIG. 3 may be considered to have an FFP 906.

Certain aspects of this disclosure relate to the handling of channels, messages and other transmissions during, or in relation to a RACH procedure. Uplink transmissions 712 may be designated as invalid when any portion of the uplink transmission 712 would cause an overlap between a resource used in the uplink transmission 712 and certain symbols and/or an idle period 908 in an FFP 906. In one example, an uplink transmission 712 may be considered invalid if the uplink transmission 712 includes a PRACH or a PUSCH that overlaps the idle period 908 in a 5G NR RAN.

A Physical Random Access Channel (PRACH) may be transmitted with a PUSCH in a MsgA 806 transmitted during a two-step random-access procedure 800. A PRACH that is defined for the MsgA 806 may be referred to herein as a "MsgA PRACH," and a PUSCH that is defined for the MsgA 806 may be referred to herein as a "MsgA PUSCH." The MsgA PRACH may be transmitted before the MsgA PUSCH in the MsgA 806. A MsgA PRACH resource is considered invalid if it overlaps the idle period 908 of an FFP 906 when FBE operation is indicated. A PRACH occasion that includes an invalid MsgA PRACH resource is discarded before encoding and/or transmission occurs. A base station 702 may maintain a list of PRACH occasions associated with an SSB index and the base station 702 may delete or otherwise remove certain PRACH occasions that would cause MsgA PRACH resources to overlap the idle period 908 of an FFP 906. A MsgA PUSCH occasion may be considered invalid if a corresponding MsgA PUSCH resource overlaps the idle period 908 of an FFP 906. A base station, e.g., the gNB 802, may maintain a list of PUSCH occasions associated with an SSB index and the gNB 802 may delete or otherwise remove certain PUSCH occasions that would cause PUSCH resources to overlap the idle period 908 of an FFP 906. For example, a gNB 802 may be configured to locate only valid PRACH and valid PUSCH for a MsgA 806 transmission. A PRACH occasion and/or resource that is considered invalid may be removed from consideration as a MsgA resource. A PUSCH occasion and/or resource that is considered invalid may be removed from consideration as a MsgA resource. The gNB 802 can then map valid PRACH occasions and/or resources and valid PUSCH occasions and/or resources for MsgA transmissions.

In one aspect, an uplink message transmitted in a 5G NR-U RAN may be considered or designated invalid if it overlaps with a set of consecutive symbols located before the start of a next channel occupancy time 910, when transmissions in the set of consecutive symbols are prohibited in FBE random access procedures. In certain implementations, the base station, which may be a gNB 802, and the UE 804 may be communicating in a 5G NR-U RAN using a shared spectrum. In these implementations, the gNB 802 and the UE 804 are prohibited from transmitting any transmissions in the set of consecutive symbols before the start of the next channel occupancy time for a duration defined by protocols and/or standards. In one example, duration of the he set of consecutive symbols is at least $T_z=\max(0.05\ T_x, 100\ us)$ before the start of the next channel occupancy time. According to certain aspects of this disclosure, $T_z$ may be treated as an idle period and transmissions that violate the prohibition on transmission may be considered invalid, such that the transmissions are discarded before encoding and/or transmission.

In another example, transmission is not permitted in a preconfigured or predefined number of consecutive starting symbols located at the start of a frame 902, 904 in an FFP 906 during an FBE operation in a 5G NR-U RAN. The number of consecutive starting symbols may be defined by standards and/or may be configured by a base station, eNB, gNB or other scheduling entity.

In one example of FBE operation, transmissions by the UE 804 are permitted within a fixed frame period if DL signals and/or channels are detected within the FFP 906. A gNB 802 may transmit signals and/or channels such as PDCCH, SSB, PBCH, GC-PDCCH, etc. within the FFP 906. When the gNB 802 and the UE 804 are communicating using a shared spectrum in a 5G NR-U RAN, the UE 804 transmits if the gNB 802 transmits first. The gNB 802 transmission initiates channel occupancy and shares the channel occupancy with UE 804. In the 5G NR-U RAN, the gNB 802 initiates occupancy by transmitting one or more DL transmission bursts starting at the beginning of the channel occupancy time 910 immediately after sensing the channel to be idle for at least a sensing slot duration $T_{sl}=9$ us. If the channel is sensed to be busy, the gNB 802 is not permitted to perform any transmission during the current channel occupancy time 910. That is, in FBE operation, a gNB 802 is required to transmit a DL signal at the beginning of the frame 902, 904 if the gNB 802 intends to occupy the medium after successful medium sensing.

UL transmission is conditioned only upon an initial transmission by the gNB 802. UL transmissions may be restricted such that a PRACH resource is considered invalid if it overlaps with the first X symbols located at the beginning of each FFP 906 when FBE operation is indicated. The X symbols may be defined to accommodate initial DL signaling by the gNB 802, which is limited to the beginning of each FFP 906 for the purposes of establishing medium occupancy, and the processing time associated with the UE 804. According to certain aspects of this disclosure, the PRACH resource can be considered invalid if it overlaps with the first X symbols at the front of each FFP 906 when FBE operation is indicated. The value of X may be configured by the network and/or specified by protocols and/or standards associated with the RAN.

According to certain aspects of this disclosure, a MsgA PUSCH resource is considered invalid if it overlaps with the first X symbols at the front of each FFP 906 when FBE operation is indicated. In some instances, the UE 804 may detect a DL signal in the later symbols or slots in an FFP 906. However, MsgA PUSCH validation is based on the minimum gap Y symbols defined from the start of the FFP 906 and the idle period 908 in the FFP 906. The value of Y can be different from X. Y defines the number of symbols at the front of each FFP 906 used to consider MsgA PUSCH invalid and X defines the number of symbols at the front of each FFP 906 used to consider MsgA PRACH invalid.

With respect to a single FFP 906, the commencement of the idle period 908 and the starting symbols at the start of the frame 902 in the FFP 906 are located at opposite edges of the FFP 906. The designation of a transmission as invalid can improve system performance when information carried in the transmission is not encoded and transmission does not commence. System performance may be further improved when invalidity of a transmission enables one or more PRACH occasions to be removed from a list of PRACH occasions maintained and communicated by the base station.

Figure 10:
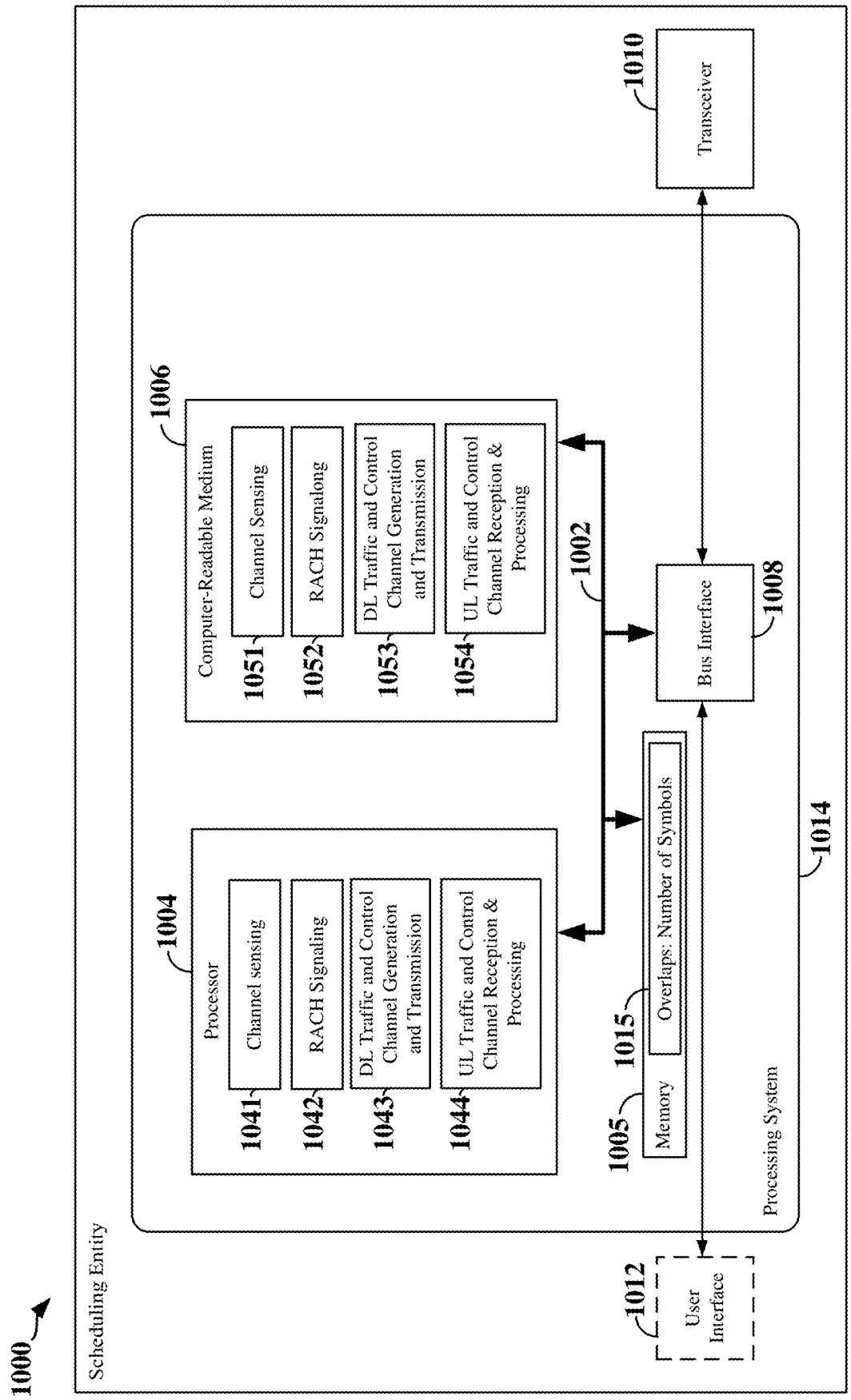
FIG. 10 is a block diagram illustrating an example of a hardware implementation for a scheduling entity employing a processing system.

FIG. 10 is a block diagram illustrating an example of a hardware implementation for a scheduling entity 1000 employing a processing system 1014. For example, the scheduling entity 1000 may be a base station (e.g., eNB, gNB), IAB node, or other scheduling entity as illustrated in any one or more of FIGS. 1, 2 and/or 6.

The scheduling entity 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1000 may be configured to perform any one or more of the functions described herein. That is, the processor 1004, as utilized in a scheduling entity 1000, may be used to implement any one or more of the processes and procedures described below.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium (e.g., air). Depending upon the nature of the apparatus, a user interface 1012 (e.g., keypad, display, speaker, microphone, joystick, touchscreen) may also be provided. Of course, such a user interface 1012 is optional, and may be omitted in some examples.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include channel sensing circuitry 1041 configured to determine whether a channel is occupied during a RACH procedure. In some examples, the channel sensing circuitry 1041 may sense whether a channel is unoccupied at the beginning of a fixed frame period during a two-step random access procedure. The channel sensing circuitry 1041 may further be configured to channel sensing software 1051 included on the computer-readable medium 1006 to implement one or more functions described herein.

The processor 1004 may further include RACH signaling circuitry 1042, configured to generate and transmit one or more signals to a UE after sensing that the channel is unoccupied. The one or more signals may cause the UE to transmit on the UL. For example, the one or more signals may include PDCCH, SSB, PBCH, GC-PDCCH, etc. The RACH signaling circuitry 1042 may further be configured to execute RACH signaling software 1052 included on the computer-readable medium 1006 to implement one or more functions described herein.

The processor 1004 may further include downlink (DL) traffic and control channel generation and transmission circuitry 1043, configured to generate and transmit downlink user data traffic and control channels within one or more slots. The DL traffic and control channel generation and transmission circuitry 1043 may operate in coordination with the RACH signaling circuitry 1042 to place the DL user data traffic and/or control information onto a time division duplex (TDD) or frequency division duplex (FDD) carrier by including the DL user data traffic and/or control information within one or more slots in accordance with the resources assigned to the DL user data traffic and/or control information. The DL traffic and control channel generation and transmission circuitry 1043 may further be configured to execute DL traffic and control channel reception and processing software 1053 included on the computer-readable medium 1006 to implement one or more functions described herein.

The processor 1004 may further include uplink (UL) traffic and control channel reception and processing circuitry 1044, configured to receive and process uplink control channels and uplink traffic channels from one or more scheduled entities. For example, the UL traffic and control channel reception and processing circuitry 1044 may be configured to receive uplink user data traffic from one or more scheduled entities. The UL traffic and control channel reception and processing circuitry 1044 may further be configured to receive UL control information from a scheduled entity.

In general, the UL traffic and control channel reception and processing circuitry 1044 may operate in coordination with the RACG signaling circuitry 1042 to schedule UL user data traffic transmissions, DL user data traffic transmissions and/or DL user data traffic retransmissions in accordance with the received UL control information. The UL traffic and control channel reception and processing circuitry 1044 may further be configured to execute UL traffic and control channel reception and processing software 1054 included on the computer-readable medium 1006 to implement one or more functions described herein.

Figure 11:
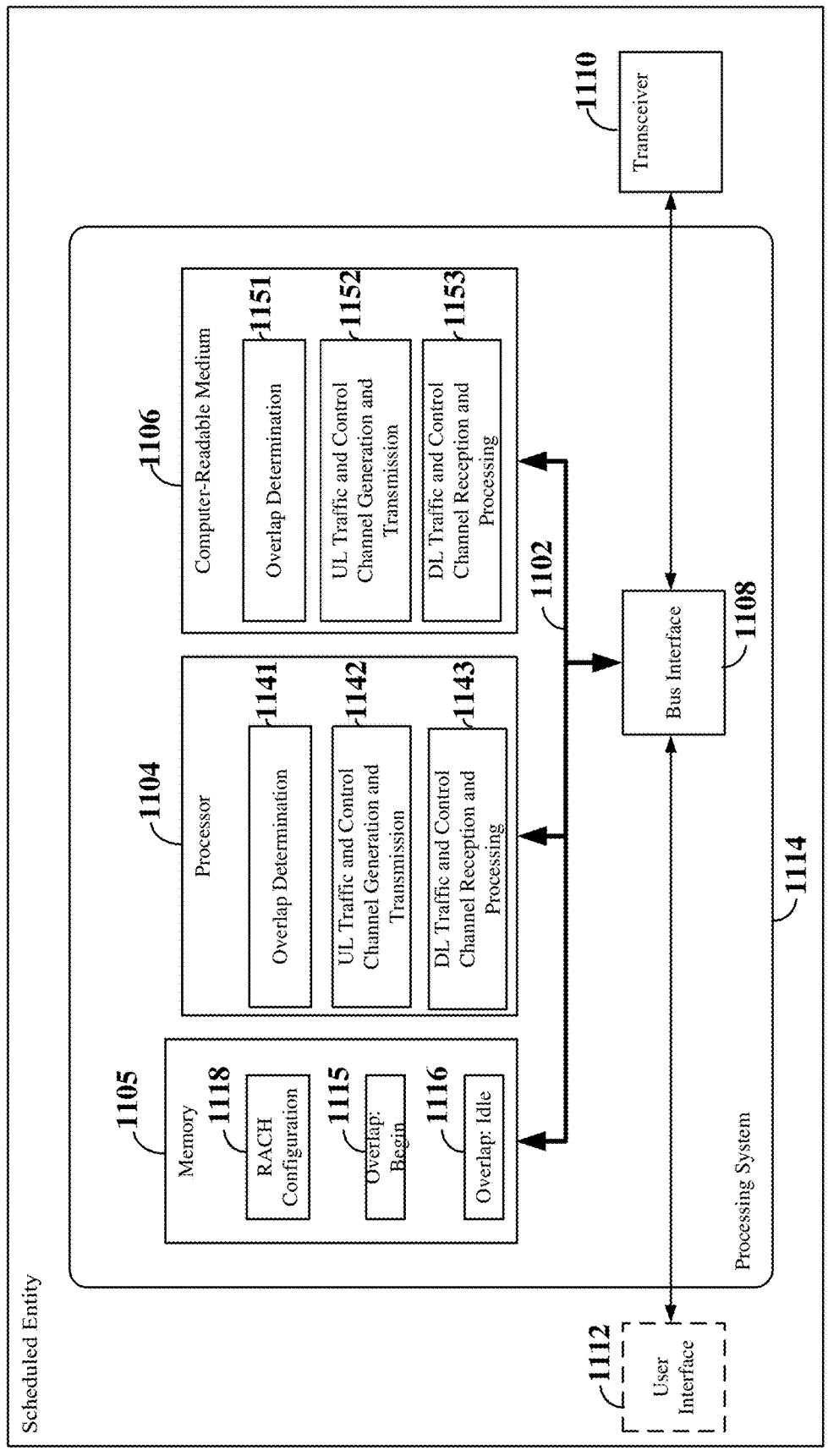
FIG. 11 is a block diagram illustrating an example of a hardware implementation for a scheduled entity employing a processing system.

FIG. 11 is a conceptual diagram illustrating an example of a hardware implementation for an exemplary scheduled entity 1100 employing a processing system 1114. In accordance with various aspects of the disclosure, an element, or any portion of an element, or any combination of elements may be implemented with a processing system 1114 that includes one or more processors 1104. For example, the scheduled entity 1100 may be a user equipment (UE), IAB node, or other type of scheduled entity as illustrated in FIGS. 1, 2 and/or 6.

The processing system 1114 may be substantially the same as the processing system 1014 illustrated in FIG. 10, including a bus interface 1108, a bus 1102, memory 1105, a processor 1104, and a computer-readable medium 1106. Furthermore, the scheduled entity 1100 may include an optional user interface 1112 and a transceiver 1110 substantially similar to those described above in FIG. 10. That is, the processor 1104, as utilized in a scheduled entity 1100, may be used to implement any one or more of the processes described below and illustrated in the various figures.

In some aspects of the disclosure, the processor 1104 may include overlap determination circuitry 1141 configured to determine whether a resource to be used for a transmission overlaps one or more symbols located at an edge of the fixed frame period. In one example, the overlap determination circuitry 1141 may determine whether the resource overlaps an idle period between successive frames that have the fixed frame period. In another example, the overlap determination circuitry 1141 may determine whether the resource overlaps a defined number of symbols located at the beginning of the fixed frame period. The overlap determination circuitry 1141 may be further configured to execute overlap determination software 1151 included on the computer-readable medium 1106 to implement one or more functions described herein.

The processor 1104 may further include uplink (UL) traffic and control channel generation and transmission circuitry 1142, configured to generate and transmit uplink control/feedback/acknowledgement information on an UL control channel. For example, the UL traffic and control channel generation and transmission circuitry 1142 may be configured to generate and transmit uplink user data traffic on an UL traffic channel (e.g., a PUSCH) in accordance with an uplink grant. In addition, the UL traffic and control channel generation and transmission circuitry 1142 may be configured to generate and transmit a PRACH. The UL traffic and control channel generation and transmission circuitry 1142 may further be configured to execute UL traffic and control channel generation and transmission software 1152 included on the computer-readable medium 1106 to implement one or more functions described herein.

The processor 1104 may further include downlink (DL) traffic and control channel reception and processing circuitry 1143, configured for receiving and processing downlink user data traffic on a traffic channel, and to receive and process control information on one or more downlink control channels. For example, the DL traffic and control channel reception and processing circuitry 1143 may be configured to receive a Physical Downlink Control Channel (PDCCH) and/or a PDSCH within a slot. In some examples, received downlink user data traffic and/or control information may be temporarily stored in a data buffer within the memory 1105. The DL traffic and control channel reception and processing circuitry 1143 may be further configured to execute DL traffic and control channel reception and processing software 1153 included on the computer-readable medium 1106 to implement one or more functions described herein.

Figure 12:
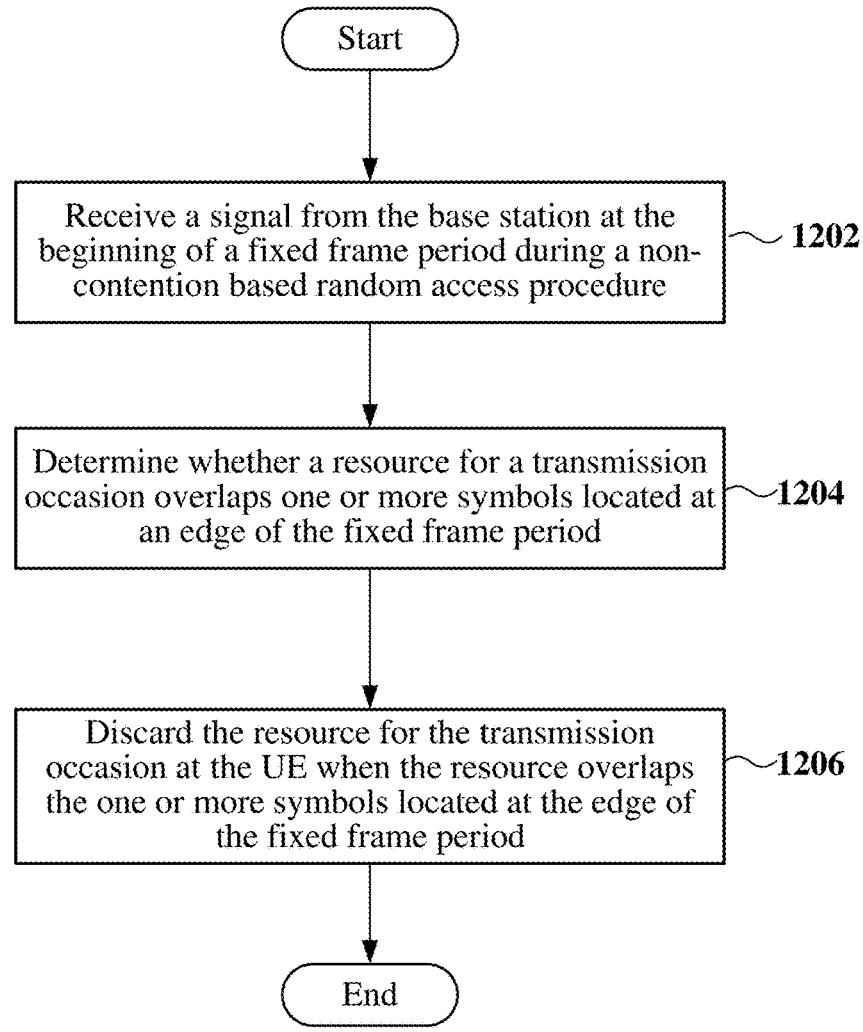
FIG. 12 is a flow chart illustrating another exemplary process operable at a scheduled entity for RACH configuration.

FIG. 12 is a flow chart illustrating a process 1200 operable at a user equipment (UE) to communicate with a base station within a wireless communication network according to some aspects of the disclosure. As described below, some or all illustrated features may be omitted in a particular implementation within the scope of the present disclosure, and some illustrated features may not be required for implementation of all embodiments. In some examples, the process 1200 may be carried out by the scheduled entity 1100 illustrated in FIG. 11. In some examples, the process 1200 may be carried out by any suitable apparatus or means for carrying out the functions or algorithm described below.

At block 1202, the scheduled entity 1100 may receive a signal from the base station at the beginning of a fixed frame period during a two-step random access procedure. For example, the DL traffic and control channel reception and processing circuitry 1143 illustrated in FIG. 11 may receive the signal.

At block 1204, the scheduled entity 1100 may determine whether a resource for a transmission occasion overlaps one or more symbols located at an edge of the fixed frame period. For example, the overlap determination circuitry 1141 shown and described above in connection with FIG. 11 may determine such overlap, where information regarding the overlap 1115, 1116 may be provided in the memory 1105 shown and described above in connection with FIG. 11.

At block 1206, the scheduled entity 1100 may the resource for the transmission occasion at the UE when the resource overlaps the one or more symbols located at the edge of the fixed frame period. For example, the UL traffic and control channel generation and transmission circuitry 1142 together with the transceiver 1110 shown and described above in connection with FIG. 11 may refrain from encoding the transmission when an overlap is determined or identified.

In certain examples, the transmission occasion includes a PUSCH occasion. The transmission occasion may further include a PRACH occasion.

In certain examples, the one or more symbols located at the edge of the fixed frame period are included in an idle period between successive frames. The transmission occasion may be as a MsgA transmission occasion in a two-step RACH procedure. The MsgA transmission occasion may include a PRACH resource and a PUSCH resource. Discarding the resource for the transmission occasion may include refraining from including the PUSCH resource in the MsgA transmission occasion. Discarding the resource used for the transmission occasion may include refraining from including the PRACH resource in the MsgA transmission occasion.

In certain examples, the transmission occasion is provided in shared spectrum of a 5G NR-U radio access network. Discarding the resource for the transmission occasion further may include removing the resource for the transmission occasion from consideration for the two-step random access procedure.

In certain examples, the one or more symbols located at the edge of the fixed frame period are located at the beginning of the fixed frame period. The number of symbols in the one or more symbols located at the edge of the fixed frame period may be configured by the base station to accommodate processing time at one or more other UEs.

Figure 13:
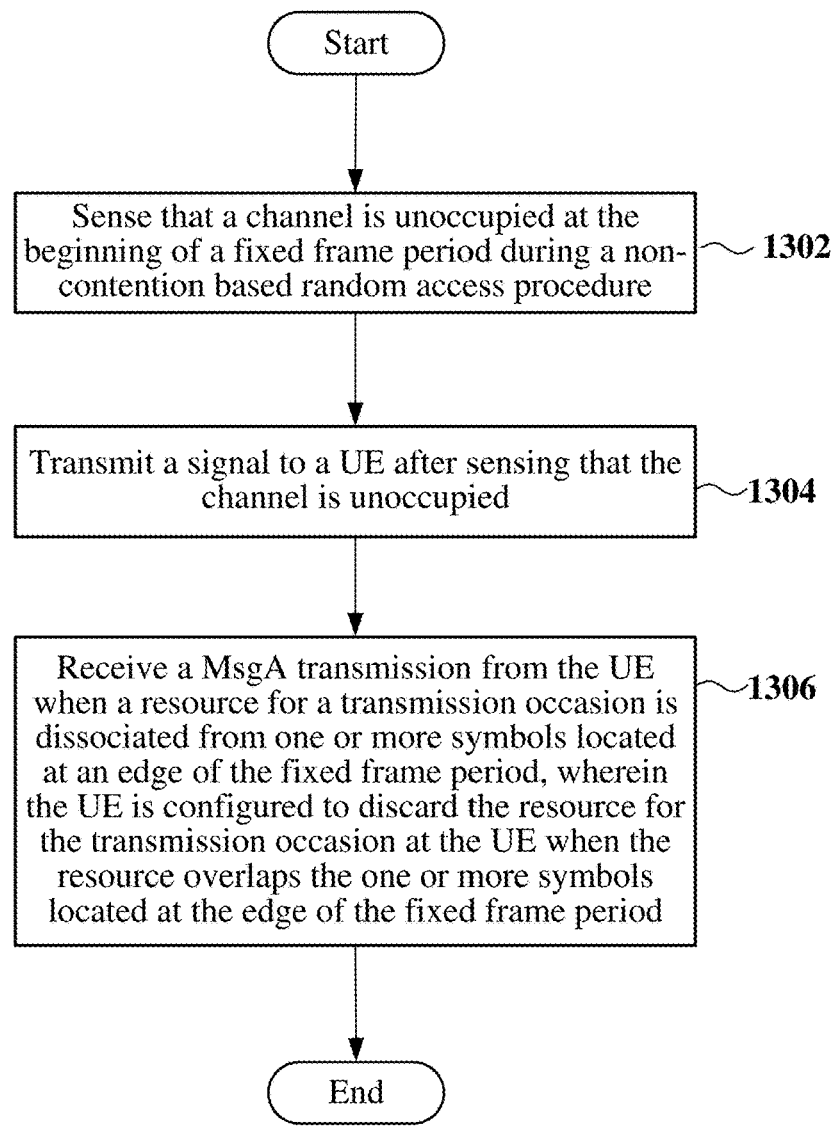
FIG. 13 is a flow chart illustrating another exemplary process operable at a scheduled entity for RACH configuration.

FIG. 13 is a flow chart illustrating a process 1300 operable at a base station within a wireless communication network. As described below, some or all illustrated features may be omitted in a particular implementation within the scope of the present disclosure, and some illustrated features may not be required for implementation of all embodiments. In some examples, the process 1300 may be carried out by the scheduling entity 1000 illustrated in FIG. 10. In some examples, the process 1300 may be carried out by any suitable apparatus or means for carrying out the functions or algorithm described below.

At block 1302, the scheduling entity 1000 may sense that a channel is unoccupied at the beginning of a fixed frame period during a two-step random access procedure. For example, the channel sensing circuitry 1041 shown and described above in connection with FIG. 10 may monitor power in the channel and/or detect signaling in the channel.

At block 1304, the scheduling entity 1000 may transmit a signal to a UE after sensing that the channel is unoccupied. For example, the DL traffic and control channel generation and transmission circuitry 1043, together with the transceiver 1010 in FIG. 11 may transmit the signal.

At block 1306, the scheduling entity 1000 may receive a MsgA transmission from the UE when a resource for a transmission occasion is dissociated from one or more symbols located at an edge of the fixed frame period. In one example, the resource used for the transmission is dissociated from one or more symbols when there is no overlap between the resource and the one or more symbols. In some examples, the UL traffic and control channel reception and processing circuitry 1044 together with the transceiver 1010 shown and described above in connection with FIG. 10 may receive the transmission. The UE may be configured to discard the resource used for transmission when the resource overlaps the one or more symbols located at an edge of the fixed frame period.

In certain examples, the transmission occasion includes a PUSCH occasion. The transmission occasion may include a PRACH occasion. The one or more symbols located at the edge of the fixed frame period may be included in an idle period between successive frames. The MsgA transmission is associated with a two-step RACH procedure. The transmission occasion may include a PRACH resource and a PUSCH resource. The UE may be configured to refrain from including the PUSCH resource in the transmission occasion when the resource overlaps the one or more symbols located at the edge of the fixed frame period. The UE may be configured to refrain from including the PRACH resource in the transmission occasion when the resource overlaps the one or more symbols located at the edge of the fixed frame period.

In some examples, the transmission occasion is provided in shared spectrum of a 5G NR-U radio access network. The UE may be configured to refrain from including the resource for the transmission occasion when the resource for the transmission occasion overlaps the one or more symbols located at the edge of the fixed frame period. The one or more symbols located at the edge of the fixed frame period may be located at the beginning of the fixed frame period. The scheduling entity 1000 may configure the number of symbols in the one or more symbols located at the edge of the fixed frame period to accommodate processing time at one or more UEs.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, and 6 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The invention claimed is:

1. A method for a user equipment (UE) to communicate with a base station within a wireless communication network, comprising:
receiving a signal from the base station at the beginning of a fixed frame period during a two-step random access channel (RACH) procedure;
determining whether a physical uplink shared channel (PUSCH) resource for a MsgA transmission occasion in the two-step RACH procedure overlaps one or more symbols located at an edge of the fixed frame period; and
discarding the PUSCH resource for the MsgA transmission occasion at the UE in response to the PUSCH resource overlapping the one or more symbols located at the edge of the fixed frame period.

2. The method of claim 1, wherein the MsgA transmission occasion includes at least one of a PUSCH occasion or a physical random access channel (PRACH) occasion.

3. The method of claim 1, wherein the one or more symbols located at the edge of the fixed frame period are included in an idle period between successive frames.

4. The method of claim 3, wherein the MsgA transmission occasion includes a physical random access channel (PRACH) resource and the PUSCH resource.

5. The method of claim 4, wherein discarding the PUSCH resource for the MsgA transmission occasion further comprises:

refraining from including the PUSCH resource in the MsgA transmission occasion.

6. The method of claim 1, wherein the MsgA transmission occasion is provided in shared spectrum of a 5G NR-U radio access network, and wherein discarding the PUSCH resource for the MsgA transmission occasion further comprises:
removing the PUSCH resource for the MsgA transmission occasion from consideration for the two-step RACH procedure.

7. The method of claim 1,
wherein the one or more symbols located at the edge of the fixed frame period are located at the beginning of the fixed frame period; and
wherein the number of symbols in the one or more symbols located at the edge of the fixed frame period is configured by the base station to accommodate processing time at one or more other UEs.

8. A user equipment (UE) within a wireless communication network, comprising:
one or more memories; and
one or more processors coupled to the one or more memories, the one or more processors configured to:
receive a signal from a base station at the beginning of a fixed frame period during a two-step random access channel (RACH) procedure;
determine whether a physical uplink shared channel (PUSCH) resource for a MsgA transmission occasion in the two-step RACH procedure overlaps one or more symbols located at an edge of the fixed frame period; and
discard the PUSCH resource for the MsgA transmission occasion at the UE in response to the PUSCH resource overlapping the one or more symbols located at the edge of the fixed frame period.

9. The UE of claim 8, wherein the MsgA transmission occasion includes at least one of a PUSCH occasion or a physical random access channel (PRACH) occasion.

10. The UE of claim 8, wherein the one or more symbols located at the edge of the fixed frame period are included in an idle period between successive frames.

11. The UE of claim 10, wherein the MsgA transmission occasion includes a physical random access channel (PRACH) resource and the PUSCH resource.

12. The UE of claim 11, wherein the one or more processors are further configured to:
refrain from including the PUSCH resource in the MsgA transmission occasion.

13. The UE of claim 8, wherein the MsgA transmission occasion is provided in shared spectrum of a 5G NR-U radio access network, and wherein the one or more processors are further configured to:
remove the PUSCH resource for the MsgA transmission occasion from consideration for the two-step RACH procedure.

14. The UE of claim 8, wherein the one or more symbols located at the edge of the fixed frame period are located at the beginning of the fixed frame period.

15. The UE of claim 14, wherein the number of symbols in the one or more symbols located at the edge of the fixed frame period is configured by the base station to accommodate processing time at one or more other UEs.

16. A method of wireless communication operable at a base station within a wireless communication network, comprising:
sensing that a channel is unoccupied at the beginning of a fixed frame period during a two-step random access channel (RACH) procedure;
transmitting a signal to a user equipment (UE) after sensing that the channel is unoccupied; and
receiving a MsgA transmission from the UE in response to a physical uplink shared channel (PUSCH) resource for a MsgA transmission occasion in the two-step RACH procedure being dissociated from one or more symbols located at an edge of the fixed frame period,
wherein the UE is configured to discard the PUSCH resource for the MsgA transmission occasion at the UE in response to the PUSCH resource overlapping the one or more symbols located at the edge of the fixed frame period.

17. The method of claim 16, wherein the MsgA transmission occasion includes at least one of a PUSCH occasion or a physical random access channel (PRACH) occasion.

18. The method of claim 16, wherein the one or more symbols located at the edge of the fixed frame period are included in an idle period between successive frames.

19. The method of claim 18, wherein the MsgA transmission occasion includes a physical random access channel (PRACH) resource and the PUSCH resource.

20. The method of claim 19, wherein the UE is configured to:
refrain from including the PUSCH resource in the MsgA transmission occasion in response to PUSCH the resource overlapping the one or more symbols located at the edge of the fixed frame period.

21. The method of claim 16, wherein the MsgA transmission occasion is provided in shared spectrum of a 5G NR-U radio access network, and wherein the UE is configured to refrain from including the PUSCH resource for the MsgA transmission occasion in response to the PUSCH resource for the MsgA transmission occasion overlapping the one or more symbols located at the edge of the fixed frame period.

22. The method of claim 16, wherein the one or more symbols located at the edge of the fixed frame period are located at the beginning of the fixed frame period, further comprising:
configuring the number of symbols in the one or more symbols located at the edge of the fixed frame period to accommodate processing time at one or more UEs.

23. A scheduling entity within a wireless communication network, comprising:
one or more memories; and
one or more processors coupled to the one or more memories, the one or more processors configured to:
sense that a channel is unoccupied at the beginning of a fixed frame period during a two-step random access channel (RACH) procedure;
transmit a signal to a user equipment (UE) after sensing that the channel is unoccupied; and
receive a MsgA transmission from the UE in response to a physical uplink shared channel (PUSCH) resource for a MsgA transmission occasion in the two-step RACH procedure being dissociated from one or more symbols located at an edge of the fixed frame period,
wherein the UE is configured to discard the PUSCH resource for the MsgA transmission occasion at the UE in response to the PUSCH resource overlapping the one or more symbols located at the edge of the fixed frame period.

24. The scheduling entity of claim 23, wherein the MsgA transmission occasion includes at least one of a PUSCH occasion or a physical random access channel (PRACH) occasion.

25. The scheduling entity of claim 23, wherein the one or more symbols located at the edge of the fixed frame period are included in an idle period between successive frames.

26. The scheduling entity of claim 25, wherein the MsgA transmission occasion includes a physical random access channel (PRACH) resource and the PUSCH resource.

27. The scheduling entity of claim 26, wherein the UE is configured to:
   refrain from including the PUSCH resource in the MsgA transmission occasion in response to the PUSCH resource overlapping the one or more symbols located at the edge of the fixed frame period.

28. The scheduling entity of claim 23, wherein the MsgA transmission occasion is provided in shared spectrum of a 5G NR-U radio access network, and wherein the UE is configured to refrain from including the PUSCH resource for the MsgA transmission occasion in response to the PUSCH resource for the MsgA transmission occasion overlapping the one or more symbols located at the edge of the fixed frame period.

29. The scheduling entity of claim 23, wherein the one or more symbols located at the edge of the fixed frame period are located at the beginning of the fixed frame period.

30. The scheduling entity of claim 29, wherein the one or more processors are further configured to:
   configure the number of symbols in the one or more symbols located at the edge of the fixed frame period to accommodate processing time at one or more UEs.

* * * * *